United States Patent [19]
Walsh

[11] 3,729,039
[45] Apr. 24, 1973

[54] CHRISTMAS TREE CONTAINER

[76] Inventor: George E. Walsh, 721 Glendale Road Franklin Lakes, N.J. 07417

[22] Filed: Jan. 7, 1972

[21] Appl. No.: 216,040

[52] U.S. Cl. ............................................. 150/52 R
[51] Int. Cl. ............................................ B65d 85/70
[58] Field of Search ..................................... 150/52 R

[56] References Cited

UNITED STATES PATENTS 2,781,811    2/1957    Dilar ................................. 150/52 R

*Primary Examiner*—Donald F. Norton
*Attorney*—Reno A. Del Ben

[57] ABSTRACT

A holder and ground cloth combination for Christmas trees characterized by a container of generally cylindrical configuration, having the dual purpose of acting as a ground cloth while the Christmas tree is displayed and adapted to act as a container for disposing of the carcass of the Christmas tree at the end of the Christmas season.

4 Claims, 6 Drawing Figures

Patented April 24, 1973
3,729,039
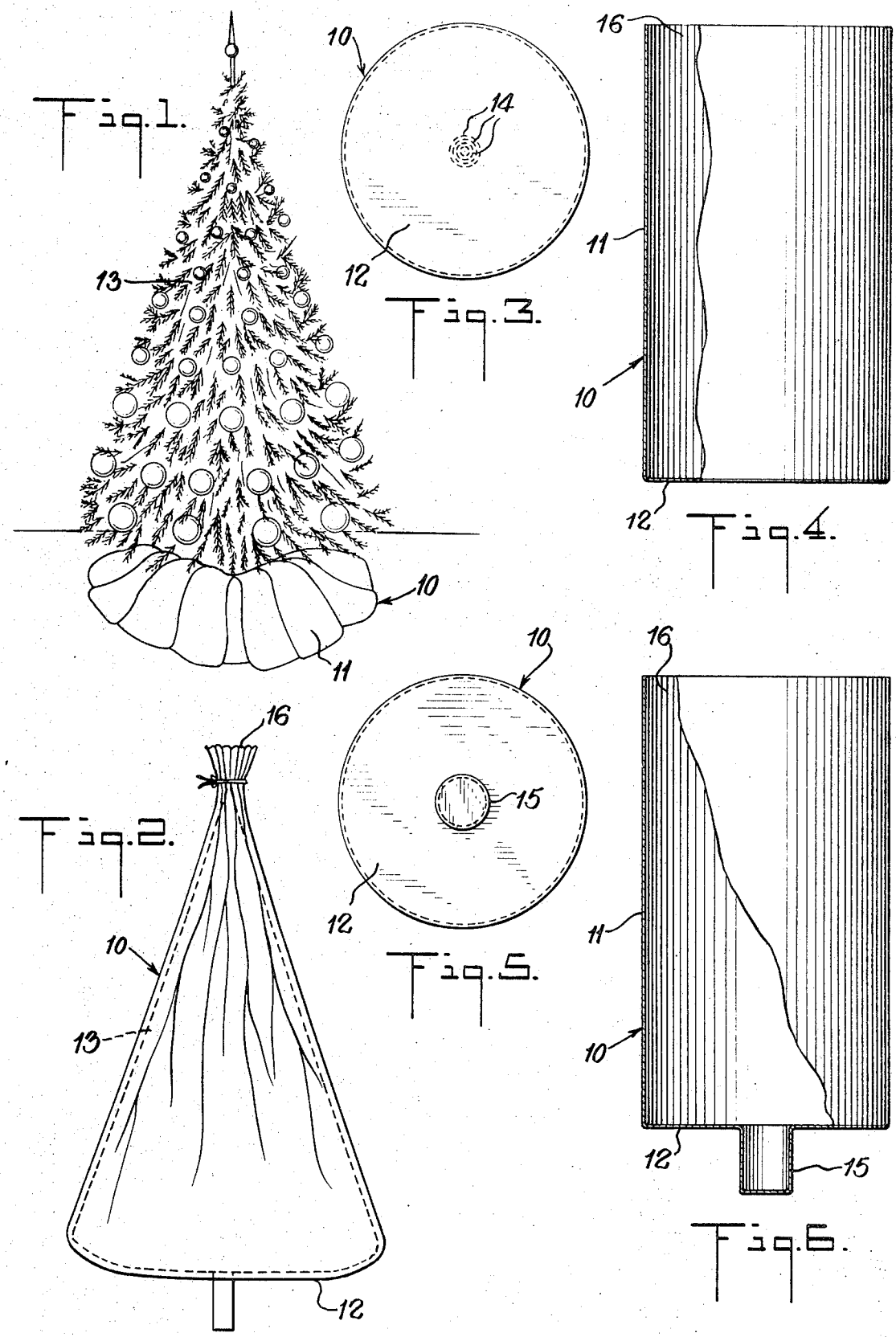

CHRISTMAS TREE CONTAINER

This invention deals with packaging and decorating devices, and in particular, with the problem of disposing of natural Christmas trees.

It is an old American custom for people, at the Christmas season, to obtain a pine tree and put it somewhere in the house and decorate it with ornaments. It gives children a great joy and satisfaction to help in decorating this tree. Unfortunately there are a number of problems in having a live or natural Christmas tree, the most bothersome of which is the disposition of the tree at the end of the Christmas season. Usually, at the end of the Christmas season, the ornaments are taken off of the tree and the carcass of the tree is hauled out of the house, leaving behind a scattering of pine needles, gum and rosin. To overcome this problem, the present invention has been conceived.

One of the objects of the present invention is to provide a means whereby the carcass of a Christmas tree may be removed from the inside of a house without leaving bunches of pine needles scattered throughout.

Another object of the present invention is to provide a decorative ground cloth around the base of a Christmas tree to gather falling needles, rosin, and gum and to keep same from ruining the floor beneath the tree.

Still another object of the present invention is to provide a container for enveloping a Christmas tree when it is to be disposed of, which container will also function as a decorative base around the Christmas tree during the period when the Christmas tree is in use.

These and other objects of the present invention will appear from time to time as these specifications proceed, and with reference to the accompanying drawings, wherein:

FIG. 1 is a view in perspective showing the invention used as a ground cloth around a Christmas tree;

FIG. 2 is a side elevational view of the invention shown used as a container for disposal of the carcass of a Christmas tree;

FIG. 3 is an end view of the invention in its preferred embodiment;

FIG. 4 is a side elevational view of the invention in its preferred embodiment, partially broken away to show the open top and closed bottom;

FIG. 5 is an end view of the invention in a alternate embodiment;

FIG. 6 is a side elevational view of the alternate embodiment of FIG. 5, partially broken away and showing an appendage to receive a portion of the trunk of the Christmas tree.

Referring to the drawings, wherein the same numerals are used for identical or similar parts of the invention:

The invention, designated generally by the numeral 10, comprises a plastic sheeting material, 11, formed into a generally cylindrical configuration, closed at one end, 12, and having a diameter and height of such size and length as to conveniently enclose an average sized Christmas tree, 13. In the center of the closed end, or base 12, a series of circular marks 14 are inscribed, at convenient concentric distances, such as at 1 inch, at 2 inches, at 3 inches, and so forth, from the center of the said base, which circular marks are identified as to their diameters.

In the alternate embodiment, shown in FIGS. 5 and 6 there is provided at the center of the base, 12, a smaller cylindrically shaped appendage, 15, which connects with the main container and which is sealed to the base 12 of the main container. The diameter of this cylindrically shaped appendage 15 will be such that it will hold the trunk of any conventional Christmas tree of normal size, the main container and the cylindrically shaped appendage, in combination, forming a container in which a Christmas tree may be placed and sealed.

The use of the present invention in its preferred embodiment is as follows:

The user will measure the trunk of the Christmas tree with which the invention is to be used and will cut an opening in the base 12, along the inscribed circular marks at the proper diameter. The invention is then layed over and around a Christmas tree holder of the conventional type and the trunk of the Christmas tree is placed into the Christmas tree holder through the hole which has been cut in the invention. The material of the invention is arranged around the tree as shown in FIG. 1 so as to form a ground cloth. At the end of the Christmas season, when it is desired to dispose of the tree, the plastic sheeting, 11, of the invention is raised up and around the tree 13 and tied or otherwise secured at the top, 16, as shown in FIG. 2, thus forming a container enveloping the tree, after which the tree trunk is removed from the stand and the tree is carried out of the house.

In the alternate embodiment of FIGS. 5 and 6, the need for cutting a hole in the base is avoided, since the appendage 15 fits around the trunk and into the tree stand.

The invention may be made in any one of a number of colors and with other features added, such as flakes of glitter, to enchance the appearance of the invention while it is functioning as a ground cloth.

While a number of different embodiments of the invention have herein been shown and described, it may readily be understood that various modifications and variations in the invention may be attained without departing from the spirit and scope of the novel concepts thereof, as defined by the claims appended hereto.

I claim:

1. A combination ground cloth and disposal container for use with a conventional Christmas tree, comprising:

plastic sheeting formed into a generally cylindrical configuration, having one end closed, guide markings inscribed at the center of the said closed end, and, closure means for closing the open end of said cylindrical configuration formed by said plastic sheeting.

2. A combination ground cloth and disposal container as claimed in claim 1 wherein the guide markings are concentric circles having a center located at the center of said closed end, and identification means are provided for identifying the size of each of said concentric circles.

3. A combination ground cloth and disposal container for use with a conventional Christmas tree, comprising:

plastic sheeting formed into a generally cylindrical configuration, having a base, an appendage of generally cylindrical configuration affixed to the center of said base, said appendage having a closed base, and the interior of said appendage communicating with the interior of the cylindrical configuration formed by said plastic sheeting, and, closure means for closing the open end of said cylindrical configuration formed by said plastic sheeting.

4. A combination ground cloth and disposal container as claimed in claim 3, wherein the plastic sheeting and appendage, in combination, form a water-tight container open at one end.

* * * * *